United States Patent
Kinney, III et al.

(10) Patent No.: US 9,699,146 B1
(45) Date of Patent: Jul. 4, 2017

(54) SECURE ACCESS TO USER DATA

(71) Applicant: Amazon Technologies, Inc., Seattle, WA (US)

(72) Inventors: Earl Robert Kinney, III, Seattle, WA (US); Stefano Buliani, Seattle, WA (US); Atanas Ivanov Ivanov, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 258 days.

(21) Appl. No.: 14/532,543

(22) Filed: Nov. 4, 2014

(51) Int. Cl.
*H04L 9/32* (2006.01)
*H04L 29/06* (2006.01)
*H04L 9/30* (2006.01)

(52) U.S. Cl.
CPC .......... *H04L 63/0428* (2013.01); *H04L 9/30* (2013.01); *H04L 2209/24* (2013.01)

(58) Field of Classification Search
None
See application file for complete search history.

(56) References Cited

U.S. PATENT DOCUMENTS

| | | | | |
|---|---|---|---|---|
| 2004/0268137 A1* | 12/2004 | Kouznetsov | ............ | G06F 21/10 713/193 |
| 2007/0133763 A1* | 6/2007 | D'Angelo | .............. | G06Q 30/04 379/93.02 |
| 2013/0305039 A1* | 11/2013 | Gauda | ................. | G06F 21/6218 713/153 |

\* cited by examiner

*Primary Examiner* — Fatoumata Traore
(74) *Attorney, Agent, or Firm* — Baker & Hostetler (57) ABSTRACT

A request is received by a provider network from a requestor for data associated with a customer of the provider network. The data is not stored at the provider network, and the request includes a first encryption key. The provider network verifies that the requestor is authorized to request data from the customer of the multi provider network. The provider network sends information pertaining to the requested data to the customer. The provider network also sends the identity of the requestor and the first encryption key. The provider network sends, to the requestor, data that is encrypted, and a decryption key for decrypting the encrypted data.

20 Claims, 5 Drawing Sheets

SECURE ACCESS TO USER DATA

BACKGROUND

A data center is a facility that houses computer systems and various networking, storage, and other related components. Data centers may, for example, provide computing services to businesses and individuals as a remote computing service or to provide "software as a service" (e.g., cloud computing). To facilitate utilization of data center resources, virtualization technologies may allow a single physical computing machine to host one or more instances of virtual machines that appear and operate as independent computer machines to a connected computer user. With virtualization, the single physical computing device can create, maintain, or delete virtual machines in a dynamic manner.

In many environments, operators of data centers that implement different types of virtualized computing, storage, and/or other network-accessible resources may allow customers to reserve or purchase access to resources in various resource acquisition modes. The computing resource provider may provide facilities for customers to select and launch the desired computing resources, deploy application components to the computing resources, and maintain an application executing in the environment. Various types and configurations of instances may be made available, including different sizes of resources executing different operating systems (OS) and/or hypervisors, and with various installed software applications, runtimes, and the like.

A data center can provide computing and data services to a large number of customers and is also accessible to other parties who are able to access the data center via networks, such as the Internet.

BRIEF DESCRIPTION OF DRAWINGS

Throughout the drawings, reference numbers may be reused to indicate correspondence between referenced elements. The drawings are provided to illustrate example embodiments described herein and are not intended to limit the scope of the disclosure.

DETAILED DESCRIPTION

A service provider, such as an entity that operates a provider network, may offer computing resources, such as computing instances and storage resources, to customers (who may also be referred to as entities or users). A customer may be any person or entity who accesses computing resources of a service provider or a provider network. The provider network may, for example, provide a web services platform. Multiple customers may access the web services platform via a computing node and issue instructions to the web services platform. The web services platform may also be referred to as a multi-tenant web services platform to denote that multiple customers may access the platform. The web services platform may respond to instructions by performing computing operations on one or more of a plurality of computing nodes that make up the web services platform.

In many cases customers may wish to share data with third parties and receive data from third parties in a secure manner and without having to pass the data through the provider network or store the data at the provider network. Additionally, third parties may wish to access some of the customer's data, where the data resides on the customer's device and not at the provider network. Customers may wish to maintain confidentiality in their data and keep data on their devices without centralized storage of their data.

In one embodiment, the provider network may implement a system to provide secure access to customer data, where the customer data is stored only on the customer's computing device. Entities may submit a request to the provider network to access or receive a copy of specified data from the customer. The requests are vetted by the provider network and if a request is deemed to be allowable, then the provider network obtains appropriate permissions from the customer, who is then asked to approve the request. The requested data is encrypted and, along with decryption keys, provided to the requesting entity. The provider network thus does not require access to the unencrypted customer data. Similarly, customers may submit a request to the provider network to send a copy of specified data from the customer to a third party. The request is vetted by the provider network and if the request is deemed to be allowable, then the provider network obtains permissions from the customer and third party as applicable. The requested data is encrypted and, along with decryption keys, provided to the third party. The provider network thus does not require access to the unencrypted customer data.

Figure 1:
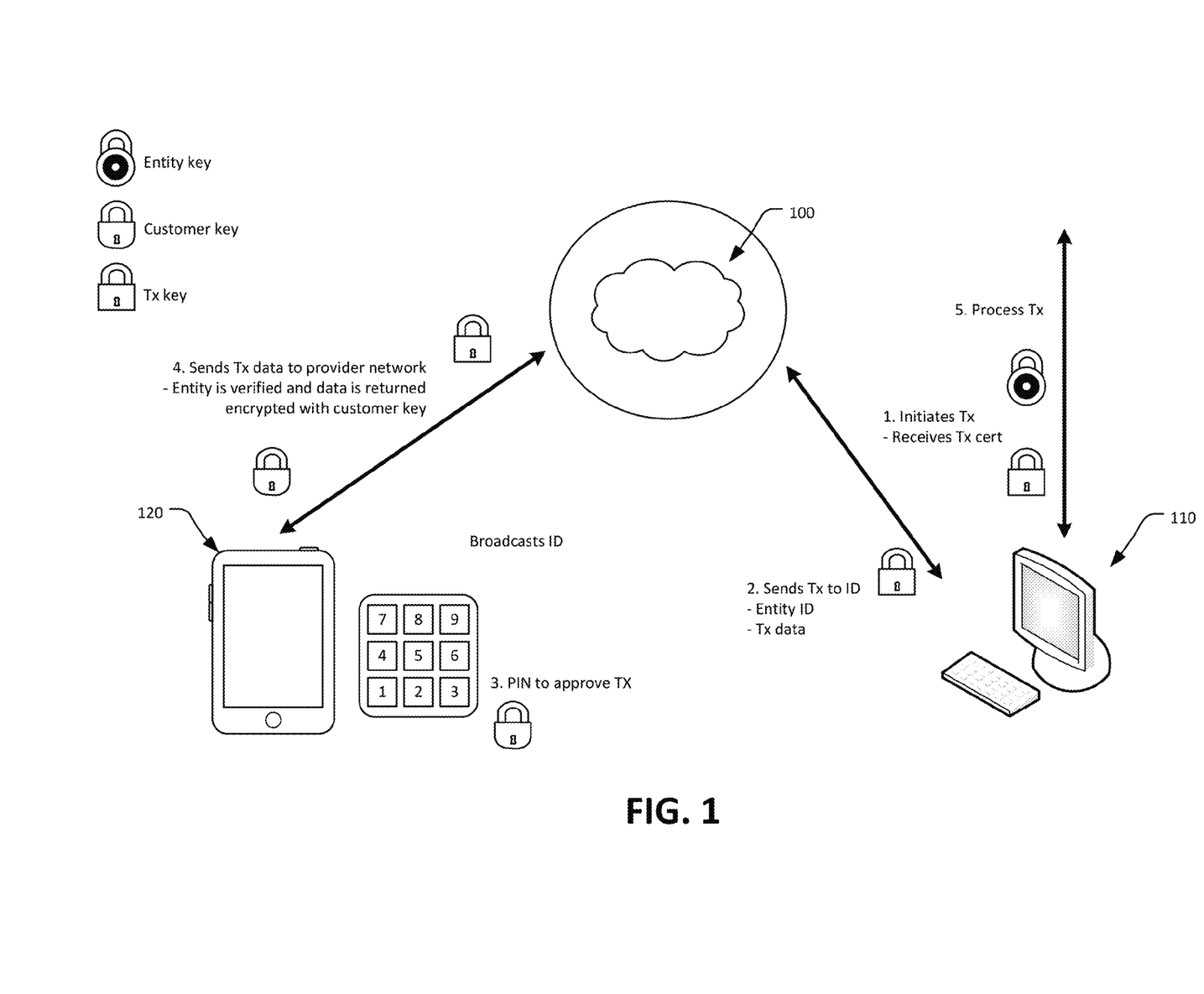
FIG. 1 is a diagram illustrating a system for allowing secure access to user data in accordance with the present disclosure.

FIG. 1 is a diagram illustrating an example implementation in accordance with this disclosure. An entity 110 may send a request for data stored at a customer's device 120 to a provider network 100. The entity 110 may be any user who registers with the provider network 100 to send data to customers of the provider network 100, or to receive data from customers of the provider network 100. In some embodiments, a customer of the provider network 100 may send a request to provider network 100 to send data to one or more entities who have registered with provider network 100. Any transmitted or received data is encrypted with a key that is exchanged between the customer and the entity. In some embodiments, the customer may enter a secret, such as a personal identification number (PIN), on the customer's device 120 to authorize the receiving or sending of data.

Requests to send data to the customer or receive data from the customer may be facilitated by the provider network 100. The provider network 100 may, for example, send a request to the customer for data that is stored at the customer's device 120. For example, the requesting entity may be a health provider that is requesting personal information from the customer's device. The provider network may notify the customer of the request and request confirmation to proceed. The customer may enter a PIN to approve the request. In some embodiments, an asymmetric key pair may be used to encrypt/decrypt the data. In other embodiments, a symmetric set of encryption keys may be generated for this transaction only. If asymmetric key pairs are used, then the public key may be sent to the customer to encrypt the requested data. Alternatively, the public key may be published and the location of the public key may be sent or otherwise made available to the customer. The public key may be used to encrypt the data, and the entity may use the corresponding private key to decrypt the encrypted data when received from the customer. When symmetric keys are used, the data may be encrypted using the symmetric encryption key, and the corresponding symmetric decryption key may be encrypted using the public key. The symmetric decryption key, having been encrypted using the public key, may be sent along with the encrypted data (encrypted using the symmetric key) to the entity. The entity receives the encrypted data, decrypts the symmetric decryption key using the private key that corresponds to the public key, and decrypts the encrypted data with the decrypted symmetric decryption key.

The provider network 100 may thus facilitate the exchange of the requested information without having possession of any decryption keys, and thus does not have the means to decrypt or otherwise access the actual customer data. In some embodiments, however, some customers may prefer to allow the provider network to have access to their data and allow the provider network to handle encryption tasks.

By implementing such a mechanism, provider network 100 allows point-to-point trusted exchange of information on an on-demand or as-needed basis. Because the provider network 100 has a trusted relationship with both the entity 110 and the customer's device 120, the provider network 100 can provide the trusted exchange without having or requiring access to the actual data.

An entity 110 may send a request to the provider network 100, who may communicate with other services at the provider network 100 to facilitate processing of the request and send the appropriate messages to the customer's device 120 to authorize the request. The provider network 100 may provide an interface for facilitating submission of the request.

The provider network 100 may also provide a service for registering entities 110 who wish to be authorized to access data or send data to the customers' devices 120 of the provider network 100. In some embodiments, an application programming interface (API) (not shown) may be implemented and published by the provider network 100 to facilitate requests from entities 110. For example, the API can be called with information, such as an entity identifier, customer identifier, public key information, and requested data. After the API is called, in one embodiment, the provider network 100 may take actions, such as verification of the entity and customer, generation of a request to the customer, and sending the request.

Figure 2:
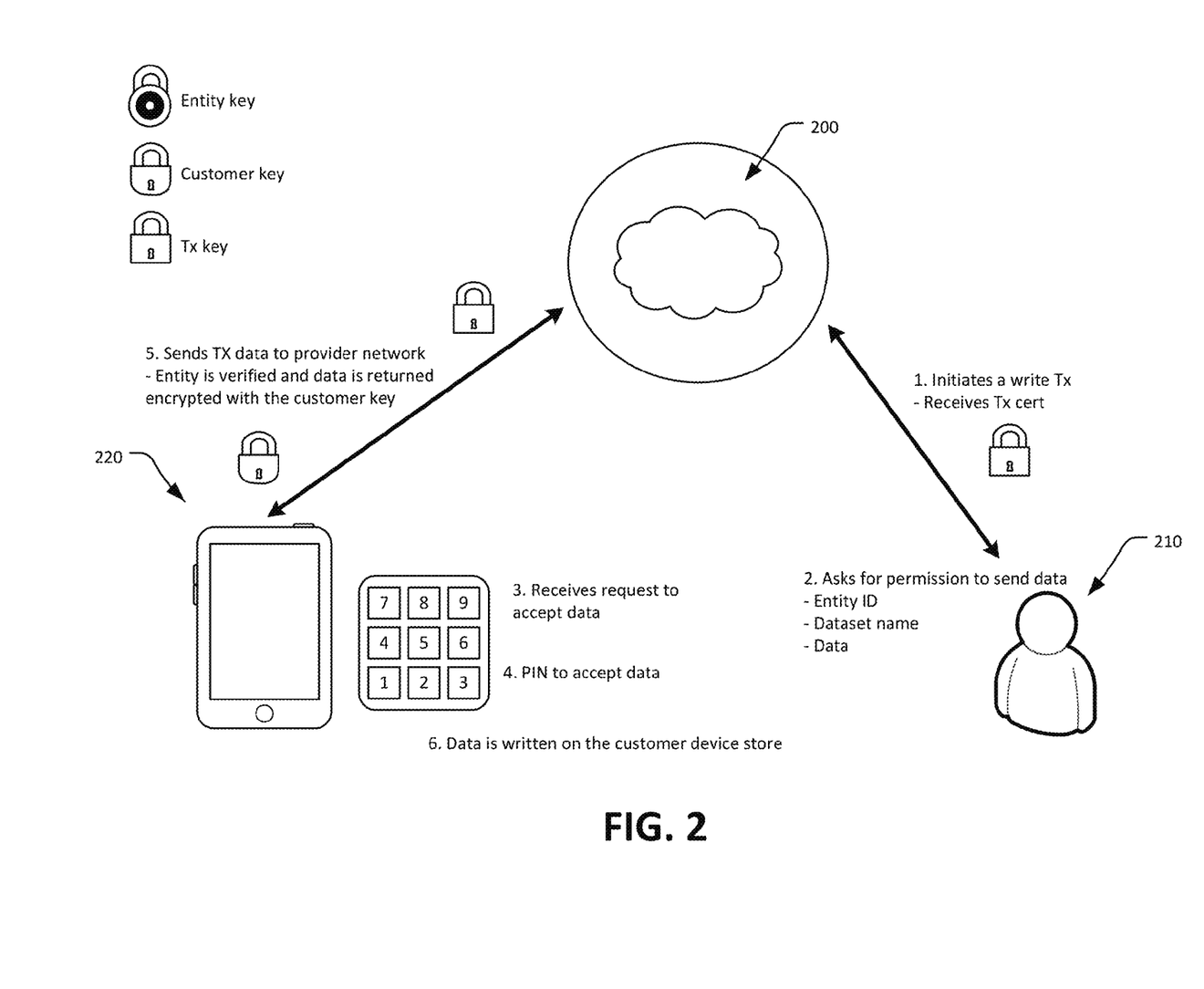
FIG. 2 is a diagram illustrating a system for allowing secure access to user data in accordance with the present disclosure.

Referring to FIG. 2, illustrated is an example implementation where an entity 210 sends a request to the provider network 200 to send data to the device 220 of a customer (not shown). The entity 210 may be any user who registers with the provider network 200 to send data to customers of the provider network 200, or to receive data from customers of the provider network 200. The provider network 200 sends a request to the customer to authorize the sending of data to the customer's device 220. For example, the requesting entity may be a health provider that is sending the customer's medical information to the customer's device. The provider network may notify the customer of the request and request confirmation to proceed. The customer may enter a PIN to authorize/approve the transfer of data. In some embodiments, an asymmetric key pair may be used to encrypt/decrypt the data. In other embodiments, a symmetric key pair may be generated for this transaction only. If asymmetric key pairs are used, then the public key may be provided to the entity to encrypt the requested data. The public key may be used to encrypt the data, and the customer may use the corresponding private key to decrypt the encrypted data when received from the entity. When symmetric keys are used, the data may be encrypted using the symmetric encryption key, and the corresponding decryption key may be encrypted using the public key. The symmetric decryption key, having been encrypted using the public key, may be sent along with the encrypted data (encrypted using the symmetric key) to the customer's device, which receives the encrypted data, decrypts the symmetric decryption key using the private key that corresponds to the public key, and decrypts the encrypted data with the decrypted symmetric key.

Figure 3:
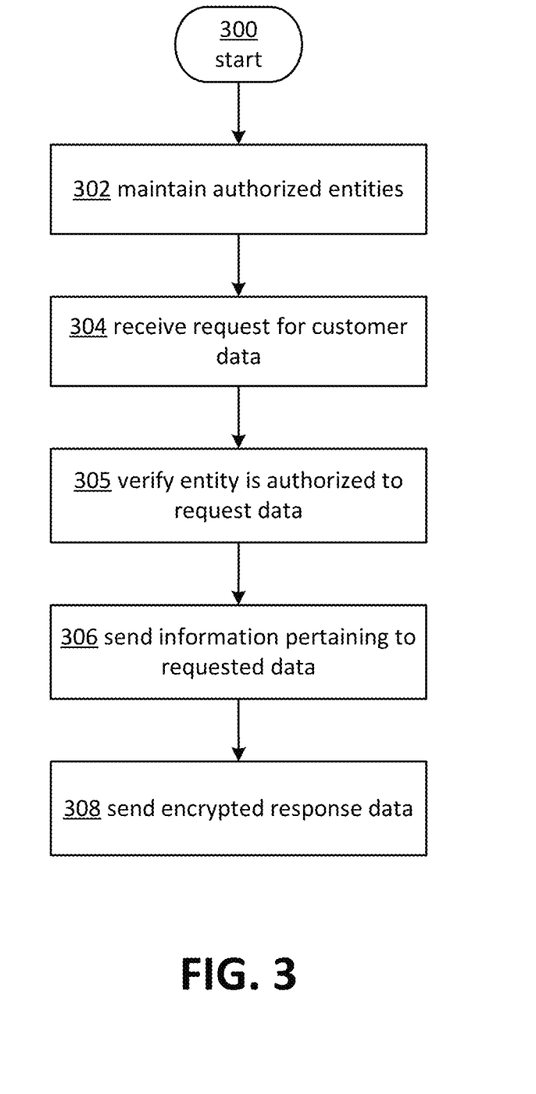
FIG. 3 is a flowchart depicting an example procedure for allowing secure access to user data in accordance with the present disclosure.

FIG. 3 illustrates an example operational procedure for allowing secure access to user data via a provider network, such as a multi-tenant web services platform. Referring to FIG. 3, operation 300 begins the operational procedure. Operation 300 may be followed by operation 302. Operation 302 illustrates maintaining a list of entities who are authorized to request data from customers of the multi-tenant web services platform. For example, companies and other entities may access a web interface to submit requests to be registered with the provider network to securely exchange data with customers of the provider network. The entities may be charged a fee for registration with the provider network. In some embodiments, the customers may initiate the transaction by submitting a request to the multi-tenant web services platform to send data to one of the registered entities.

Operation 302 may be followed by operation 304. Operation 304 illustrates receiving, by the multi-tenant web services platform from one of the entities, a request for data associated with one of the customers of the multi-tenant web services platform. In an embodiment, the request may include identification of a specified data item that is stored on a computing device associated with the one customer and not stored at the multi-tenant web services platform. Furthermore, the request may include a public encryption key, or an identifier indicative of a location from which the public encryption key is accessible. The specified data item may be selectable by the entity, for example, by requesting a specific data item or by requesting general information, such as records pertaining to a particular topic.

Operation 304 may be followed by operation 305. Operation 305 illustrates verifying that the entity is authorized to request data from the one customer of the multi-tenant web services platform. The multi-tenant web services platform may, for example, verify that the entity is registered to access data from customers of the provider network.

Operation 305 may be followed by operation 306. Operation 306 illustrates sending, by the multi-tenant web services platform to the computing device to the customer, information pertaining to the requested data item, along with an identity of the entity and the public encryption key. In one embodiment, the customer's computing device may have installed an application from the multi-tenant web services platform that processes requests for data from entities via the multi-tenant web services platform and handles encryption and decryption processes. The application may also interact with the operating system of the computing device to access the requested data or to store data that is received from the entity.

Operation 306 may be followed by operation 308. Operation 308 illustrates, in response to receiving confirmation from the computing device that the customer approves of the request, sending response data that includes the specified data item that is encrypted using a private encryption key, and a decryption key for decrypting the specified data item that is encrypted using the public encryption key.

In some embodiments, the private encryption key and decryption key may be generated on the client device. Alternatively, the private encryption key and decryption key may be generated by the multi-tenant web services platform. The private encryption key and the decryption key may be generated for one-time use for the exchange of the requested data. Additionally, the multi-tenant web services platform may provide an option for the customer to select the encryption framework for encrypting the data. For example, the customer may prefer that the multi-tenant web services platform handles encryption/decryption activities and may send the requested data to the multi-tenant web services platform so that the multi-tenant web services platform can encrypt and send to the entity. The customer may select an encryption method that is provided by the multi-tenant web services platform, and may be charged different fees depending on the method selected.

In some embodiments, the customers may submit requests that data be sent to an entity that is registered at the multi-tenant web services platform as trusted recipients of the customers' data. The customer's data may be encrypted using a public key provided by the receiving entity, or a public key that is published by the customer.

The selection of encryption methods and where the encryption and decryption takes place may be determined automatically or manually based on one or more factors. Examples of such factors include an input by the customer, an input by the entity, an input or policy from the provider network, or characteristics of the customer's computing device, such as battery life or processing capacity.

Various aspects of the disclosure have been described with regard to certain examples and embodiments, which are intended to illustrate but not to limit the disclosure. It should be appreciated that the subject matter presented herein may be implemented as a computer process, a computer-controlled apparatus or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

Networks established by or on behalf of an entity, such as a company or organization, to provide one or more services (such as various types of cloud-based computing or storage) accessible via the Internet and/or other networks to a distributed set of clients may be termed provider networks. Such a provider network may include one or more data centers hosting various resource pools, such as collections of physical and/or virtualized computer servers, storage devices, networking equipment, and the like, that may be used to implement and distribute the infrastructure and services offered by the provider network. The resources may in some embodiments be offered to clients in units called "instances," such as virtual or physical compute instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), genera-purpose or special-purpose operating systems, platforms that support various interpreted or compiled programming languages, such as Ruby, Perl, Python, C, C++, and the like, or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

Figure 4:
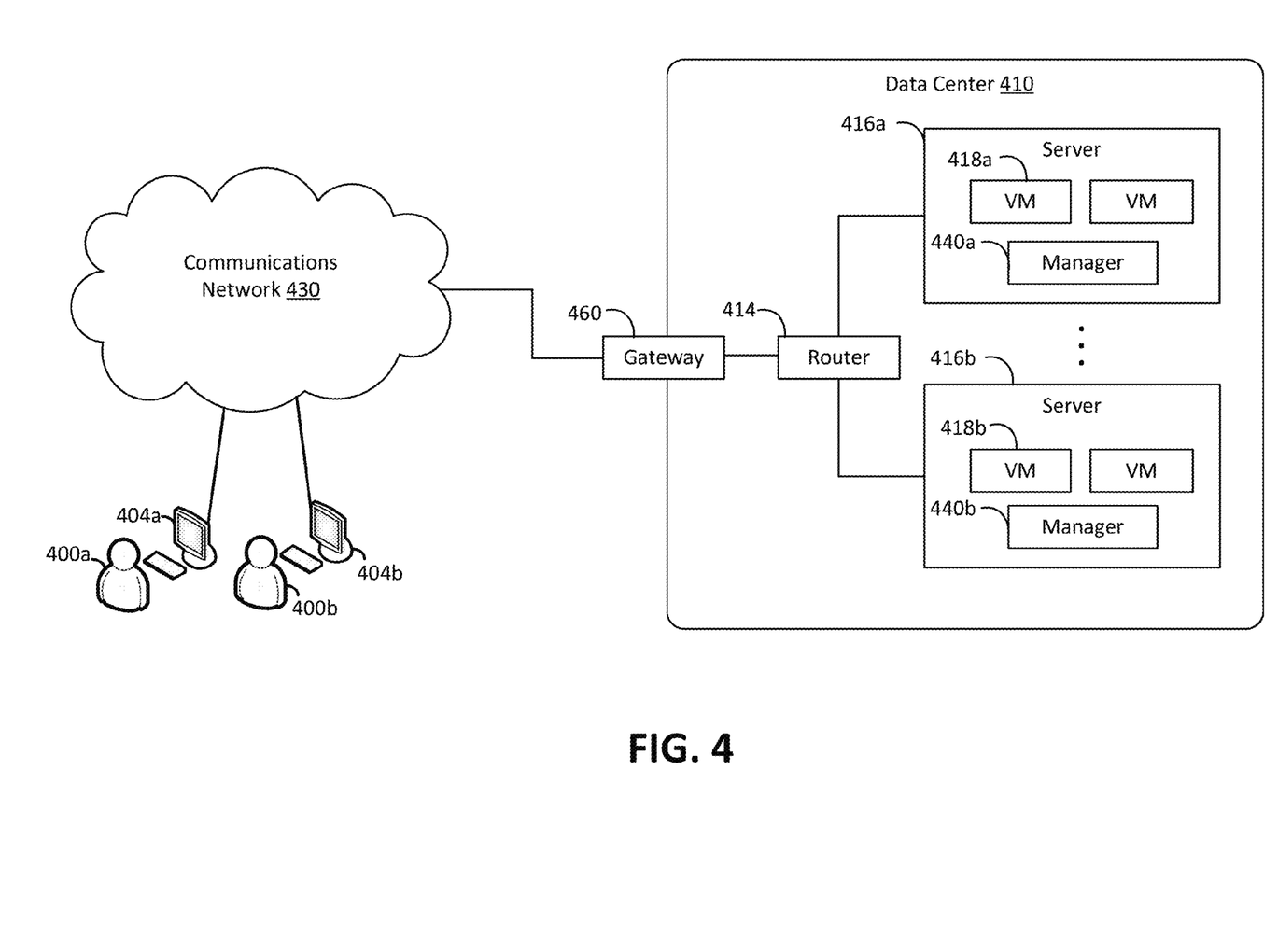
FIG. 4 is a diagram illustrating an example computing system that may be used in some embodiments.

FIG. 4 illustrates an example computing environment in which the embodiments described herein may be implemented. FIG. 4 is a diagram schematically illustrating an example of a data center 410 that can provide computing resources to users 400*a* and 400*b* (which may be referred herein singularly as "a user 400" or in the plural as "the users 400") via user computers 402*a* and 402*b* (which may be referred herein singularly as "a computer 402" or in the plural as "the computers 402") via a communications network 430. Data center 410 may be configured to provide computing resources for executing applications on a permanent or an as-needed basis. The computing resources provided by data center 410 may include various types of resources, such as data processing resources, data storage resources, data communication resources, and the like. Each type of computing resource may be general-purpose or may be available in a number of specific configurations. For example, data processing resources may be available as virtual machine instances. The instances may be configured to execute applications, including web servers, application servers, media servers, database servers, and the like. Data storage resources may include file storage devices, block storage devices, and the like.

Each type or configuration of computing resource may be available in different sizes, such as large resources, consisting of many processors, large amounts of memory, and/or large storage capacity, and small resources consisting of fewer processors, smaller amounts of memory, and/or smaller storage capacity. Customers may choose to allocate a number of small processing resources as web servers and/or one large processing resource as a database server, for example.

Data center 410 may include servers 416a and 416b (which may be referred herein singularly as "a server 416" or in the plural as "the servers 416") that provide computing resources available as virtual machine instances 414a and 414b (which may be referred herein singularly as "a virtual machine instance 414" or in the plural as "the virtual machine instances 414"). The virtual machine instances 414 may be configured to execute applications, including web servers, application servers, media servers, database servers, and the like. Other resources that may be provided include data storage resources (not shown) and may include file storage devices, block storage devices, and the like.

The availability of virtualization technologies for computing hardware has provided benefits for providing large scale computing resources for customers and allowing computing resources to be efficiently and securely shared between multiple customers. For example, virtualization technologies such as those provided by VMware or other virtualization systems may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 4, communications network 430 may, for example, be a publicly accessible network of linked networks and possibly operated by various distinct parties, such as the Internet. In other embodiments, communications network 430 may be a private network, such as, for example, a corporate or university network that is wholly or partially inaccessible to non-privileged users. In still other embodiments, communications network 430 may include one or more private networks with access to and/or from the Internet.

Communications network 430 may provide access to computers 402. Computers 402 may be computers utilized by customers 400 or other customers of data center 410. For instance, user computer 402a or 402b may be a server, a desktop or laptop personal computer, a tablet computer, a wireless telephone, a personal digital assistant (PDA), an e-book reader, a game console, a set-top box, or any other computing device capable of accessing data center 410. User computer 402a or 402b may connect directly to the Internet (e.g., via a cable modem or a Digital Subscriber Line (DSL)). Although only two user computers 402a and 402b are depicted, it should be appreciated that there may be multiple user computers.

Computers 402 may also be utilized to configure aspects of the computing resources provided by data center 410. In this regard, data center 410 might provide a web interface through which aspects of its operation may be configured through the use of a web browser application program executing on user computer 402. Alternatively, a stand-alone application program executing on user computer 402 might access an application programming interface (API) exposed by data center 410 for performing the configuration operations. Other mechanisms for configuring the operation of the data center 410, including deploying updates to an application, might also be utilized.

Servers 416a and 416b (which may be referred herein singularly as "a server 416" or in the plural as "the servers 416") shown in FIG. 4 may be standard servers configured appropriately for providing the computing resources described above and may provide computing resources for executing one or more applications. In one embodiment, the computing resources may be virtual machine instances 414. In the example of virtual machine instances, each of the servers 416 may be configured to execute an instance manager 420a or 420b (which may be referred herein singularly as "an instance manager 420" or in the plural as "the instance managers 420") capable of executing the virtual machine instances. The instance managers 420 may be a virtual machine monitor (VMM) or another type of program configured to enable the execution of virtual machine instances 414 on servers 416, for example. As discussed above, each of the virtual machine instances 414 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 410 shown in FIG. 4, a router 414 may be utilized to interconnect the servers 416a and 416b. Router 414 may also be connected to gateway 460, which is connected to communications network 430. Router 414 may manage communications within networks in data center 410, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 4 has been greatly simplified and that many more networks and networking devices may be utilized to interconnect the various computing systems disclosed herein. These network topologies and devices should be apparent to those skilled in the art.

It should also be appreciated that data center 410 described in FIG. 4 is merely illustrative and that other implementations might be utilized. Additionally, it should be appreciated that the functionality disclosed herein might be implemented in software, hardware, or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 5:
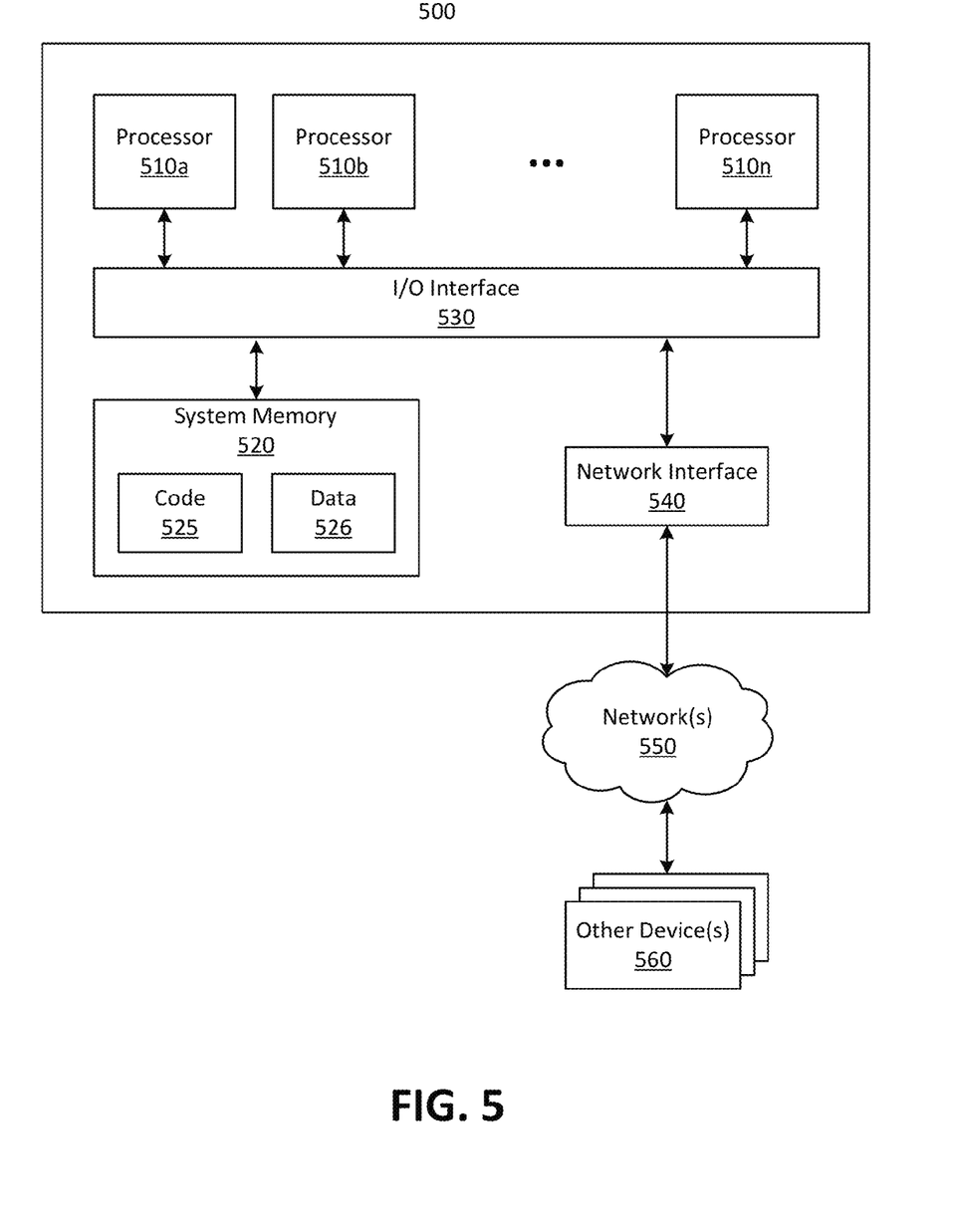
FIG. 5 is a diagram illustrating an example computing system that may be used in some embodiments.

In at least some embodiments, a server that implements a portion or all of one or more of the technologies described herein may include a general-purpose computer system that includes or is configured to access one or more computer-accessible media. FIG. 5 illustrates such a general-purpose computing device 500. In the illustrated embodiment, computing device 500 includes one or more processors 510a, 510b, and/or 510n (which may be referred herein singularly as "a processor 510" or in the plural as "the processors 510") coupled to a system memory 520 via an input/output (I/O) interface 530. Computing device 500 further includes a network interface 540 coupled to I/O interface 530.

In various embodiments, computing device 500 may be a uniprocessor system including one processor 510 or a multiprocessor system including several processors 510 (e.g., two, four, eight, or another suitable number). Processors 510 may be any suitable processors capable of executing instructions. For example, in various embodiments, processors 510 may be general-purpose or embedded processors implementing any of a variety of instruction set architectures (ISAs), such as the x86, PowerPC, SPARC, or MIPS ISAs, or any other suitable ISA. In multiprocessor systems, each of processors 510 may commonly, but not necessarily, implement the same ISA.

System memory 520 may be configured to store instructions and data accessible by processor(s) 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 520 as code 525 and data 526.

In one embodiment, I/O interface 530 may be configured to coordinate I/O traffic between processor 510, system memory 520 and any peripheral devices in the device, including network interface 540 or other peripheral interfaces. In some embodiments, I/O interface 530 may perform any necessary protocol, timing, or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computing device 500 and other device or devices 560 attached to a network or network(s) 550, such as other computer systems or devices as illustrated in FIGS. 1 through 4, for example. In various embodiments, network interface 540 may support communication via any suitable wired or wireless general data networks, such as types of Ethernet networks, for example. Additionally, network interface 540 may support communication via telecommunications/telephony networks, such as analog voice networks or digital fiber communications networks, via storage area networks, such as Fibre Channel SANs, or via any other suitable type of network and/or protocol.

In some embodiments, system memory 520 may be one embodiment of a computer-accessible medium configured to store program instructions and data as described above for FIGS. 1 and 2 for implementing embodiments of the corresponding methods and systems. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 500 via I/O interface 530. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 500 as system memory 520 or another type of memory. Further, a computer-accessible medium may include transmission media or signals, such as electrical, electromagnetic, or digital signals, conveyed via a communication medium, such as a network and/or a wireless link, such as may be implemented via network interface 540. Portions or all of multiple computing devices, such as those illustrated in FIG. 5, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

A network set up by an entity, such as a company or a public sector organization, to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In some embodiments, an API or a programming interface sub-system may be provided for facilitating the submission of requests for secure access to user data. The API may be configured to receive electronic messages that encode identifiers indicative of a request for data. In response to receiving one of the electronic messages, the API may send second electronic messages indicative of information pertaining to the requested data.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems, and data structures may also be stored (e.g., as software instructions or structured data) on a computer-readable medium, such as a hard disk, a memory, a network or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer-implemented method for allowing secure access to user data via a multi-tenant web services platform, the method comprising:
   maintaining a list of entities who are authorized to request data from customers of the multi-tenant web services platform;
   receiving, by the multi-tenant web services platform from one of the entities, a request for data associated with one of the customers of the multi-tenant web services platform, wherein the request includes identification of a specified data item that is stored on a computing device associated with the one customer and not stored at the multi-tenant web services platform, and wherein the request includes a public encryption key or an identifier indicative of a location from which the public encryption key is accessible;
verifying that the one entity is authorized to request data from the one customer of the multi-tenant web services platform;
sending, by the multi-tenant web services platform to the computing device of the one customer, information pertaining to the specified data item and identity of the one entity and the public encryption key; and
in response to receiving confirmation from the computing device, sending by the multi-tenant web services platform to the one entity, response data that includes:
the specified data item that is encrypted using a private encryption key; and
a decryption key for decrypting the specified data item that is encrypted using the public encryption key.

2. The method according to claim 1, wherein the public encryption key and private decryption key are generated on the computing device.

3. The method according to claim 1, wherein the public encryption key and private decryption key are generated by the multi-tenant web services platform.

4. The method according to claim 1, wherein the one entity is registered by the multi-tenant web services platform for submitting requests for data.

5. The method according to claim 1, further comprising providing an option for the one customer to select an encryption framework for encrypting data.

6. A system configured to allow secure access to user data via a provider network, the system comprising:
at least one memory having stored therein computer instructions that, upon execution by one or more processors of the system, at least cause the system to:
receive, by the provider network, a request from a requestor for requested data associated with a customer of the provider network, wherein the requested data is not stored at the provider network, and wherein the request includes a public encryption key or a pointer to the public encryption key;
verify by the provider network that the requestor is authorized to request the requested data from the customer of the provider network;
send, by the provider network to the customer, information pertaining to the requested data, identity of the requestor, and the public encryption key; and
in response to receiving authorization by the customer to send the requested data, send, by the provider network to the requestor, encrypted response data, wherein the encrypted response data includes the requested data and at least one decryption key, wherein the requested data is encrypted using a symmetric encryption key, and the symmetric encryption key is encrypted using the public encryption key.

7. The system of claim 6, wherein the symmetric encryption key and the decryption key are generated by the customer.

8. The system of claim 6, wherein the symmetric encryption key and the decryption key are generated by the provider network.

9. The system of claim 6, wherein the symmetric encryption key and the decryption key are generated for one-time use.

10. The system of claim 6, wherein the requester is registered at the provider network for submitting requests for data.

11. The system of claim 6, wherein the response data is encrypted by the provider network.

12. The system of claim 11, further comprising computer instructions that, upon execution by the one or more processors of the system, at least cause the system to provide an option for the customer to select an encryption framework for encrypting the requested data.

13. The system of claim 6, wherein the requested data is selectable by the requestor.

14. The system of claim 6, further comprising computer instructions that, upon execution by the one or more processors of the system, at least cause the system to implement an application programming interface (API) configured to:
receive first electronic messages that encode identifiers indicative of the requested data; and
in response to receiving one of the first electronic messages, send second electronic messages that encode the encrypted requested data.

15. The system of claim 14, wherein the API is published and accessible to a plurality of requestors for submitting and receiving requests to access customer data.

16. A non-transitory computer-readable storage medium having stored thereon computer-readable instructions, the non-transitory computer-readable storage medium comprising instructions that upon execution on one or more computing devices, at least cause the one or more computing devices to perform operations comprising:
maintaining a list of entities who are authorized to request data from customers of a multi-tenant web services platform;
receiving, by the multi-tenant web services platform from one of the entities, a request for data associated with one of the customers of the multi-tenant web services platform, wherein the request includes identification of a specified data item that is stored on a computing device associated with the one customer and not stored at the multi-tenant web services platform, and wherein the request includes a public encryption key or an identifier indicative of a location from which the public encryption key is accessible;
verifying that the one entity is authorized to request data from the one customer of the multi-tenant web services platform;
sending, by the multi-tenant web services platform to the computing device of the one customer, information pertaining to the specified data item and identity of the one entity and the public encryption key; and
in response to receiving confirmation from the computing device, sending by the multi-tenant web services platform to the one entity, response data that includes:
the specified data item that is encrypted using a private encryption key; and
a decryption key for decrypting the specified data item that is encrypted using the public encryption key.

17. The non-transitory computer-readable storage medium of claim 16, wherein the public encryption key and private decryption key are generated on the computing device.

18. The non-transitory computer-readable storage medium of claim 16, wherein the public encryption key and private decryption key are generated by the multi-tenant web services platform.

19. The non-transitory computer-readable storage medium of claim 16, wherein the one entity is registered by the multi-tenant web services platform for submitting requests for data.

20. The non-transitory computer-readable storage medium of claim 16, wherein the operations further comprise providing an option for the one customer to select an encryption framework for encrypting data.

* * * * *